United States Patent [19]

Glaser

[11] 4,023,950
[45] May 17, 1977

[54] METHOD AND APPARATUS FOR MELTING AND PROCESSING GLASS

[76] Inventor: Hellmut I. Glaser, Rte. 2, Evergreen Hills, Granville, Ohio 43023

[22] Filed: Apr. 28, 1975

[21] Appl. No.: 572,359

[52] U.S. Cl. .................................. 65/29; 65/1; 65/2; 65/135; 65/162; 65/164; 65/345; 65/346
[51] Int. Cl.² ..................... C03B 37/02; C03B 5/24
[58] Field of Search ............... 65/135, 1, 161, 162, 65/345, 346, 164, 29

[56] References Cited

UNITED STATES PATENTS

| 2,465,283 | 3/1949 | Schlehr | 65/135 X |
| 3,012,373 | 12/1961 | Willis | 65/161 X |
| 3,328,144 | 6/1967 | Glaser | 65/135 X |
| 3,406,021 | 10/1968 | Day et al. | 65/135 X |
| 3,519,412 | 7/1970 | Olink | 65/135 X |
| 3,649,231 | 3/1972 | Trethewey | 65/161 X |

OTHER PUBLICATIONS

The Manufacturing Technology of Continuous Glass Fibres, Elsevier Scientific Publishing Co., Loewenstein, 1973, pp. 79–84.

Primary Examiner—Robert L. Lindsay, Jr.

[57] ABSTRACT

The disclosure embraces a method of and apparatus for melting and processing glass suitable for attenuation to continuous fibers or filaments and more particularly to an arrangement having a limited capacity for processing glass providing a highly refined glass for the production of comparatively small quantities of textile fibers or filaments of usual glass compositions and for limited production of textile fibers or filaments of special glasses.

7 Claims, 3 Drawing Figures

U.S. Patent    May 17, 1977    4,023,950
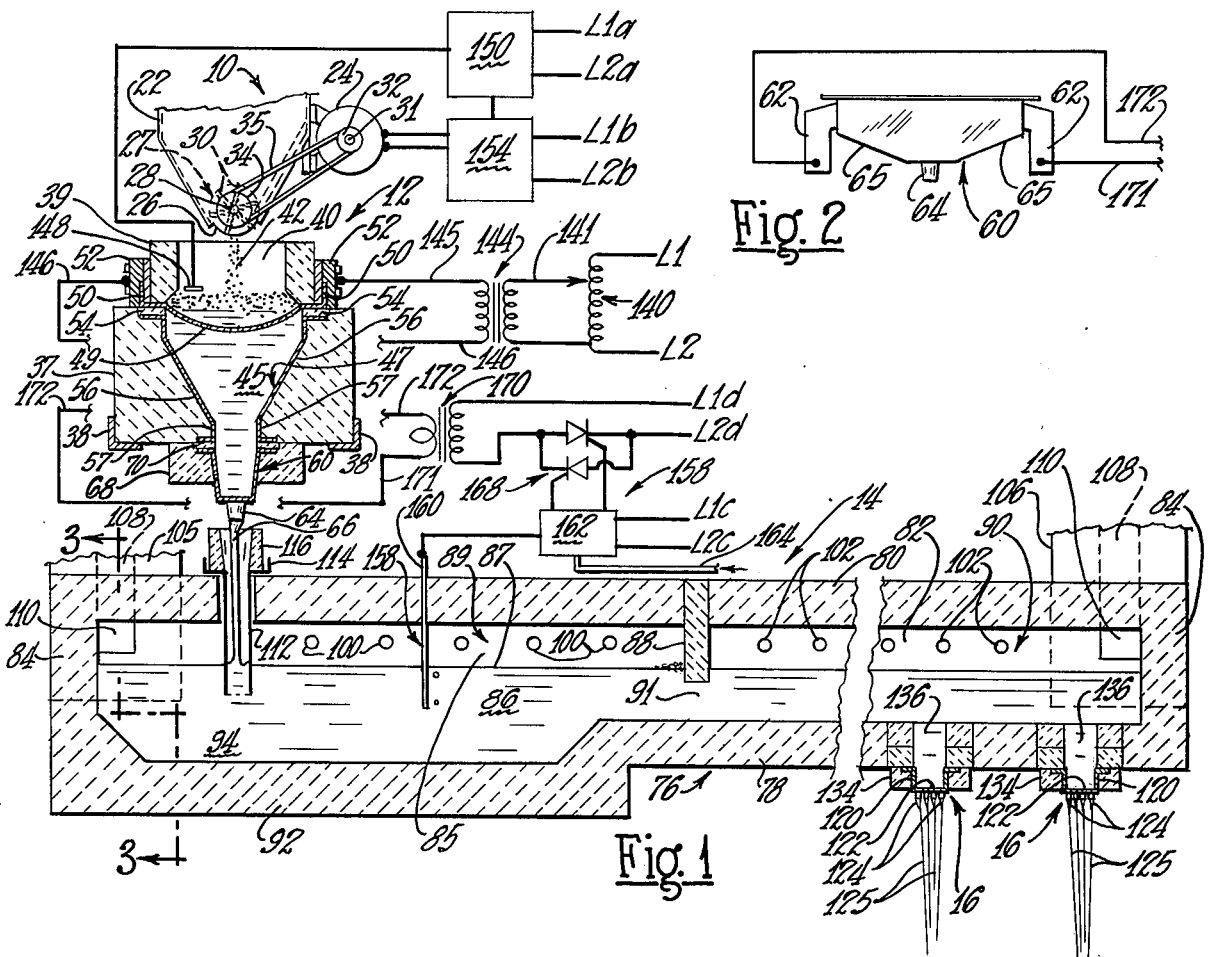
Fig. 2
Fig. 1
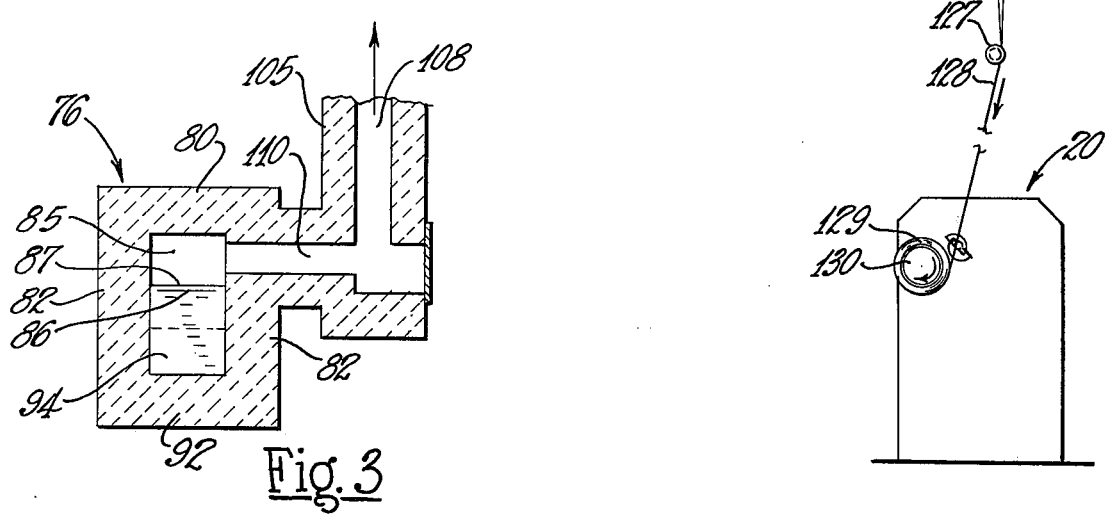
Fig. 3

METHOD AND APPARATUS FOR MELTING AND PROCESSING GLASS

The invention relates to a method and arrangement for melting and processing glass to a high degree of refinement suitable for attenuation to fibers or filaments and more particularly to a method and arrangement having a limited production capacity for processing glass to supply a highly refined glass to a single stream feeder or bushing or a small number of stream feeders or bushings for the production of special runs or limited quantities of textile fibers or filaments where it would be uneconomical to employ a conventional melting and refining furnace and forehearth construction of substantial capacity.

Conventional glass melting and refining furnaces and forehearth constructions in general use have large productive capacities of many tons for supplying glass to a large number of stream feeders or bushings associated with forehearth constructions. Large melting and refining furnaces employed for processing glass for use in forming fibers or filaments are not suited for limited fiber or filament production as they occupy considerable space, the heating requirements are very high, are costly to install and are relatively inefficient unless they are operated at their full rated capacities. Their inefficiency increases with reduction of output of glass. Furthermore, when it is desired to utilize the furnace and forehearth construction with a different glass, the change-over operation is time consuming, the cost is relatively high and a large amount of glass is wasted.

Comparatively small combination melter and feeder constructions have been used for melting marbles or pieces of prerefined glass and streams of the glass attenuated to fibers but in such processes the starting material is glass which has previously been processed through a melting and refining furnace of conventional construction in forming the glass marbles.

The invention embraces a method of feeding glass batch into a comparatively small melter or chamber and flowing glass from the melter into a distributor or channel in which further refinement of the glass occurs and glass from the distributor or channel fed to one or more stream feeders or bushings for discharging streams of the glass which are attenuated to fibers or filaments.

Another object of the invention resides in the provision of a facility of small capacity for melting glass batch and processing and refining the glass in a distributor to provide a highly refined glass suitable for attenuation to textile filaments.

Another object of the invention resides in a compact inexpensive apparatus of comparatively small capacity for melting glass batch and refining the glass for forming fibers or filaments which is adapted to accommodate small production runs or test runs of special or particular glasses with a minimum expenditure of heat energy, the refined glass being comparable in quality to glass processed and refined in a conventional furnace of large capacity.

Another object of the invention resides in a glass melting and processing method and facility particularly adapted to melt and process glass for attenuation to fibers or filaments in which the feeding of the glass batch and the melting of the batch are controlled and in which the amount of glass in the facility is at a minumum, being sufficient to supply the requirements of one or more stream feeders so that there is a minimum waste of glass when it is desired to change from one glass composition to another.

Another object of the invention resides in the provision of a method of processing glass wherein molten glass is delivered into a distributor or flow channel in which the molten glass is processed to a high degree of refinement suitable for attenuation to fine textile filaments and wherein the distributor or channel is vented at its end zones to facilitate the discharge of gases.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is a semischematic longitudinal sectional view of a melting and distributing arrangement of the invention for processing glass;

FIG. 2 is a side elevational view of a feeder for flowing glass from a melter, and FIG. 3 is a sectional view taken substantially on the line 3—3 of FIG. 1.

Referring to the drawings in detail and initially to FIG. 1, the apparatus or arrangement for carrying out the method of the invention is inclusive of a glass batch feeding arrangement 10, a batch melting facility 12 and a glass refining and distributing apparatus 14. The refined glass is conveyed by the distributor to one or more glass stream feeder units 16 from which flow streams of glass which are attenuated into continuous filaments by winding a strand of the filaments into a package on a winding machine 20.

The batch feeding arrangement 10 includes a container or hopper 22 supported by suitable means (not shown) and contains a supply of glass batch. Associated with the hopper 22 is a batch feeding and metering means which includes an electrically-energizable variable speed motor 24. The lower end of the hopper is provided with a discharge opening 26 and disposed above the opening 26 and mounted in journal bearings (not shown) is a batch feeder 27 including a shaft 28 provided with batch feeding radial vanes or blades 30.

The shaft 31 of the motor 24 is equipped with a sprocket 32 and shaft 28 is equipped with a sprocket 34, the sprockets being connected by a chain 35. Rotation of the shaft 28 and radial vanes 30 by the motor 24 meters or feeds the glass batch material through the opening 26 into the melting facility 12 at a rate controlled by the speed of the motor 24.

The melter 12 includes a refractory wall structure 37 mounted by structural support members 38. Supported upon the refractory construction 37 is a second member 39 of refractory, the refractory construction 39 defining a walled entrance region 40 to receive batch material 42 in comminuted form from the rotary batch feeder 27. The refractory construction 37 is configurated to provide a melting chamber or space 45 in registration with the entrance region 40 provided by the refractory 39.

The chamber 45 is provided with a lining 47 fashioned of high temperature resistant material such as an alloy containing platinum. Disposed in the upper region of the chamber 45 is an electric current conducting member, heater strip or heater screen 49 of rectangular shape provided with a substantial number of small perforations to facilitate flow of molten glass through the strip.

The heater strip 49 is fashioned with laterally extending portions 50 which are engaged with electric current conducting terminal blocks or bus bars 52 whereby heat developed by current flow through the strip 49 reduces the glass batch to a molten condition. The heater strip 49 is electrically insulated from the metal liner 47 by members 54 of insulating material. The convergently arranged walls 56 of the liner 47 are joined at their lower ends with wall portions 57 which are in registration with the walls of a feeder, chamber or member 60 disposed beneath or below the chamber 45.

In the form of apparatus disclosed, the feeder or member 60 is of rectangular configuration and receives molten glass from the melting chamber 45. As shown in FIG. 2, the end walls of the stream feeder or chamber 60 are provided with terminal lugs or blocks 62 to which electric energy is supplied for controlling the temperature and hence viscosity of the molten glass in the feeder 60. The floor of the feeder at its central region is provided with a depending projection 64 having an orifice or passage means through which flows a stream 66 of molten glass.

As shown in FIG. 2, the floor portions or regions 65 at each side of the depending projection 64 are inclined downwardly or converged toward the central region so as to promote the flow of molten glass toward the orifice or passage in the depending projection 64. The feeder 60 is surrounded by refractory 68 and is electrically insulated from the metal liner 47 by insulators 70. The circuit for controlling the melting rate of the glass batch and the flow rate of glass of the stream 66 is hereinafter described.

Disposed beneath the melter and chamber 60 is a glass refining and distributing apparatus 14 which includes a distributor or structure 76 of refractory which is elongated and in exterior configuration resembles a conventional forehearth construction of a glass melting furnace. The distributor 76 includes a floor 78, a roof or cover 80, side walls 82, one of which is shown in FIG. 1, and end walls 84. The floor and side walls provide a channel 85 of rectangular cross section which contains molten glass 86 delivered by the stream 66 of glass from the melter and chamber 60 and conveys the glass to the stream feeders 16 arranged along the floor 78 of the structure 76.

In the embodiment illustrated, the melting apparatus is disposed adjacent and above one end region of the distributor channel 85. The roof portion 80 of the channel 85 is provided with a depending skimmer block or obstruction 88 at a mid-region of the channel 85 which extends downwardly and slightly beneath the normal level of the molten glass indicated at 87 in the channel 85 providing a restricted passage 91 for the glass in its traverse lengthwise and downstream of the channel.

Refinement of the glass occurs in the channel 85 in the regions 89 and 90 at each side of the skimmer block 88 as the glass flows toward the right-hand end of the channel. The obstruction or skimmer block 88 prevents impurities or dross from flowing to the region of delivery of glass into the stream feeder or feeders 16. The floor 78 of the channel construction is fashioned with a depending portion 92 at the left end region of the channel providing a recess or sump 94 which collects unmelted pieces of glass or pieces of refractory that may be carried by the stream 66 of glass into the channel.

The opposed side walls 82 of the channel construction at the region 89 of the channel 85 at the left side of the skimmer block 88 are provided with heating means such as combustion burners 100 of conventional character for heating the glass in the channel to refine the glass as it flows toward the skimmer block 88.

The opposed side walls 82 of the construction 76 between the skimmer block 88 and the right-hand end 84 are provided with heating means such as combustion burners 102 of conventional character for refining the glass and maintaining the molten glass at the proper temperature and viscosity for delivery of the glass into one or more glass stream feeders 16.

Disposed at the respective ends of the distributor construction 76 are vent stacks 105 and 106 which are offset from the channel 85 as shown in FIG. 3. Each stack 106 has a flue or vent passage 108 which is in communication with a transverse passage 110 at each end region of the channel 85 above the level of the molten glass in the channel. Through this venting arrangement, the gases of combustion and volatiles from the glass are vented or exhausted through the stacks at each side of the skimmer block or obstruction 88.

An enclosure means is provided for the glass stream 66 at its region of delivery into the channel 85. As shown in FIG. 1, the cover 80 of the channel 85 is provided with an opening which accommodates a tubular means, tube or sleeve 112 extending downwardly and terminating below the level of the glass in the channel 85. The tube 112 is fashioned of platinum, an alloy of platinum or other high temperature resistant material.

The upper end region of the tube 112 is provided with a circular flange construction 114 in which is supported an annular member 116 of refractory or other high temperature resistant material. By reason of the exit of the tube 112 below the level of the glass in the channel 85, gases in the channel are prevented or sealed from moving upwardly through the tube 112. The guide tube 112 for the stream 66 of glass flowing into the distributor isolates the region of delivery of the stream into the glass in the distributor minimizing turbulence in the glass in the distributor.

The distributor construction 76 may be equipped with one or more stream feeder units or bushings 16, there being two units illustrated in FIG. 1. Each unit 16 includes a stream feeder or bushing 120 having a floor 122 provided with groups of orifices or passages through which flow streams 124 of glass which are attenuated into filaments 125. The filaments 125 of a group are converged by a shoe or member 127 into a strand or linear bundle 128 wound into a package 129 on a rotating mandrel 130 of a winding machine 20, the mandrel being rotated in a conventional manner by a motor (not shown).

While only one winding machine 20 is illustrated in FIG. 1, it is to be understood that a winding machine is provided for winding the group of filaments attenuated from streams from each of the stream feeder units 16 into a package. Each of the stream feeders or bushings 120 is mounted beneath the channel structure 76 and is embraced and supported by members 134 of refractory material. Each of the bushings 120 is in registration with a well 136 which conveys molten glass from the channel 85 into a bushing.

The circuits for operating the glass batch feeder 10, for melting the glass in the melter 12 and for regulating the temperature and hence viscosity of the glass in the stream feeder 60 associated with the melter are illustrated schematically in FIG. 1.

The power circuit for supplying electric energy to the melter screen or heater strip 49 for melting the glass batch includes a manually variable autotransformer 140 which is supplied with electric energy from current supply lines L1 and L2 which voltage may, for example, be 440 volts. The autotransformer 140 is of conventional character usually referred to as a "Variac", manufactured by General Radio Corporation, having an adjustable control element 141.

The output of the autotransformer 140 is supplied to a voltage-reducing transformer 144 which is adapted to reduce its output voltage in a range of about three to ten volts. The current conductors 145 and 146 convey the low voltage current to the bus bars 52 connected with the respective ends of the heater strip 49 for melting the glass batch. The operator adjusts the control element 141 of the variable autotransformer 140 to attain a desired melting rate of the batch.

The circuitry or system includes means for controlling the operation of the variable speed direct current motor 24 for regulating the feeding of the batch 42 from the hopper 22 into the melter 12. The motor control is responsive to the level of the glass batch above the heater strip 49 in the melter.

The arrangement includes a metal plate 148 disposed above the unmelted batch material above the heater strip 49, the plate 148 acting as one element or conductor of a capacitor of the capacitance unit or capacitance gauge 150 which is conventional such as manufactured by Drexelbrook Engineering Company, Model 408-4002-1. The surface of the unmelted batch above the heater strip 49 has a lower electrical loss than air and hence the batch surface acts as the other element of the capacitor.

The output of the capacitance gauge 150 measures the relative position of the batch level and the signal is fed to a controller 154. The capacitance unit 150 is supplied with current through supply lines L1a and L2a, and the controller 154 supplied with current through supply lines L1b and L2b. The controller 154 includes a manually adjustable set point potentiometer which is adjusted to preset the desired batch surface level or position.

The controller 154 comprises two units. One unit is an amplifier such as a Reliance Model 11C-52 manufactured by Reliance Electric Company which amplifies and converts small control signals into sufficient direct current to drive the variable-speed direct current motor 24 for feeding glass batch into the melter.

The other unit of the controller 154 is a Foxboro Model 62H controller, manufactured by Foxboro Company, which contains the set point potentiometer for rendering the batch input signal compatible with the input to the amplifier, Reliance Model 11C-52, so that the glass batch feeding motor 24 is rotated at a speed determined by the correlation of the set point signal and the batch position signal from the capacitance unit 150.

The control system includes an arrangement for regulating the temperature of the bushing construction 60 for regulating the rate of flow of the glass stream 66 into the horizontal glass flow channel of distributor 76, the flow rate of the glass of the stream 66 being determined by the level of the glass in the channel.

The glass level control system includes a sensor 158 embodying a tube or probe 160 extending through an opening in the roof 80 of the glass flow channel 85 into the molten glass, the sensor tube 160 being connected with an electrically-actuated air flow regulator 162, the latter being connected by a tube 164 with a low pressure air supply. The regulator 162 is supplied with current from supply lines L1c and L2c. A small flow of air at very low pressure is maintained through the tube 160 and the air extruded as successive bubbles from the lower end of the tube extending into the molten glass.

If the predetermined level of the glass, indicated at 87, in the channel 85 is lowered, the back pressure in the tube or probe 160 is reduced and the level signal is fed to the regulator 162 which transmits a signal to a silicone controlled rectifier unit 168 of conventional construction. such as manufactured by Electronic Control Systems, Inc., Model ECS 713N.

The signal decreases the firing angle of the silicone controlled rectifier and the rectifier increases the current flow to a transformer 170 thereby increasing the current flow through conductors 171 and 172 to the terminal blocks 62 of the feeder or member 60. The increased current flow increases the temperature of the glass in the feeder 60, lowering its viscosity, thus increasing the flow of glass of the glass stream 66 to increase the amount of glass in the channel 85 to its predetermined normal level. The transformer 170 and the rectifier unit 168 are supplied with electric current from supply lines L1d and L2d.

When the glass 86 in the channel 85 is raised above its predetermined normal level, the back pressure in the sensor tube 158 is increased by the additional head of glass, which signal increases the firing angle of the rectifier of the unit 168 and the rectifier decreases the current flow to the transformer 170 and thereby decreases the current flow through the feeder 60. The decreased current flow reduces the temperature of the glass in the feeder 60 raising the viscosity of the glass of the stream 66 thus reducing the flow of glass of the stream 66 to lower the level of the glass in the channel 85.

The operation of the arrangement in carrying out the method of the invention is as follows: The power circuit for supplying electric energy to the heater strip 49 for melting the glass batch at the upper region of the chamber 45 is energized by connection of the autotransformer 140 with current supply lines L1 and L2. The operator adjusts the control element 141 of the autotransformer 140 to effect the desired electric current flow through the heater strip 49 to effect melting of the maximum amount of glass batch 42 required to supply the maximum throughput of molten glass flowing from the stream feeders or bushings 116.

The molten glass 86 in the channel 85 flows through the wells or passages 136 into the glass stream feeders 16. The streams of glass 124 flowing from each of the stream feeders 16 are attenuated into continuous filaments 125 which are converged into strands and each strand wound into a package on a rotating mandrel 130 of a winding machine, indicated at 20.

The set point of the potentiometer of the controller 154 is adjusted so that the rate of feed of glass batch 42 into the melter 45 is substantially equal to the throughput of glass from the stream feeders or bushings 16 so as to maintain the amount of glass in channel 85 substantially constant.

If the glass level decreases in the channel 85, then the temperature of the bushing or feeder 60 is increased as hereinabove described to reduce the viscosity of the glass in the feeder 60 to flow more glass by the glass stream 66 into the channel. If the glass flow of the stream 66 exceeds the throughput of glass through the bushings 16, then the temperature of the glass in the feeder 60 is decreased to reduce the amount of glass of the stream flowing into the channel 85.

The rate of flow of glass of the stream 66 changes the amount of molten glass in the melting chamber 45. If the glass level is lowered in the melting chamber 45, the level of the batch 42 on the molten glass adjacent the melter screen 49 is lowered. The lowering of the glass batch is sensed by the sensor plate 148 and the signal transmitted to the capacitance unit 150. The signal from the capacitance unit 150 is transmitted to the controller 154 which increases the speed of the motor 24 and rotates the batch feeder 27 to increase the delivery of glass batch into the melter 45.

If the glass level is raised in the melting chamber 45, the level of the batch 42 on the molten glass is raised. The increase in height of the glass batch above the heater strip 49 is sensed by the sensor plate 148 and the signal transmitted to the capacitance unit 150 and the signal from the unit 150 transmitted to the controller 154 which reduces the speed of the motor 24 and hence decreases the rate of delivery of glass batch to the melter.

The variations in air pressure in the sensor probe 160 transmitted to the silicone controlled rectifier unit 168 effect an increase or decrease of the temperature and hence viscosity of the glass in the feeder 60 beneath the melter chamber 45 to increase or decrease the flow rate of the glass of the stream 66 to maintain the glass in the channel 85 substantially at the predetermined level indicated at 87.

The sensor plate 148 of the capacitance unit 150 sensing the level of glass batch above the heater strip 49 is effective through the capacitance unit 150 and the controller 154 to vary the speed of the motor 24 and thereby control or regulate the feed rate of glass batch 42 from the hopper 22 into the melting chamber 45.

Through the use of the method and arrangement of the invention, comparatively short production runs of textile filaments of standard glasses or test runs of special glasses may be carried on with a minimum amount of energy expended in conditioning and processing the glass. The molten glass is effectively refined to a high degree suitable for attenuation to fine textile filaments in the refining zones, regions or compartments 89 and 90 at each side of the skimmer block 88. The vent stacks 108 convey away volatiles and gases of combustion from the refining zones of the channel 85 so that there is no pressure on the glass in the channel 85.

In changing from one glass composition to another, the operator interrupts the operation of the batch feeding arrangement and drains the small amount of glass from the melting chamber 45 and the glass in the narrow channel 85 so that there is a minimum of waste.

It is apparent that, within the scope of the invention, modifications and different arrangements may be made other than as herein disclosed, and the present disclosure is illustrative merely, the invention comprehending all variations thereof.

I claim:

1. The method of processing glass including feeding particulate glass batch into a melter, melting the glass batch in the melter, flowing molten glass from the melter into a distributor below the melter, refining the glass in the distributor, flowing streams of the refined glass from the distributor, sensing the relative position of the surface of the glass batch in the melter, and regulating the rate of feeding of the glass batch into the melter responsive to the sensed relative position of the surface of the glass batch.

2. The method of processing glass including feeding glass batch into a melter, melting the particulate glass batch in the melter, flowing molten glass from the melter into a feeder, heating the glass in the feeder by electric current, flowing glass from the feeder into a glass distributor below the melter, heating the glass in the distributor to refine the glass, flowing streams of refined glass from the distributor, sensing the relative position of the surface of the glass batch in the melter, regulating the rate of feeding of the glass batch as determined by the sensed relative position of the surface of the glass batch, sensing the level of the glass in the distributor, and regulating the rate of flow of the glass from the feeder into the distributor by varying flow of electric current to the feeder as determined by the sensed level of the glass in the distributor to maintain substantially constant the amount of glass in the distributor.

3. The method according to claim 7 including exhausting gases from each end of the distributor through vents at the end regions of the distributor.

4. Apparatus for processing glass, in combination, a melting chamber, means for feeding particulate glass batch from a supply into the melting chamber, heating means for melting the batch material, a horizontal distributor disposed beneath the chamber providing an elongated glass refining and distributing channel, tubular means for flowing a stream of molten glass from the chamber into the glass refining and distributing channel adjacent one end region of the channel, said tubular means having its outlet extending below the level of the glass in the channel, means for applying heat to the glass in the channel to refine the glass, at least one stream feeder connected with the distributor receiving molten glass from the channel at a region spaced from the region of delivery of the stream of glass from the chamber into the channel, an obstruction in the channel disposed between the region of entry of the glass into the channel and the glass stream feeder, said obstruction extending below the level of the glass in the channel whereby the glass flows beneath the obstruction in its traverse toward the glass stream feeder, and stack means at each end region of the channel for venting gases from the glass refining and distributing channel.

5. Apparatus for processing glass including, in combination, a melting chamber, means for feeding particulate glass batch into the melting chamber, a motor for operating the batch feeding means, means for heating the glass batch in the melting chamber to melt the glass, a feeder chamber disposed beneath the melting chamber and arranged to receive glass from the melting chamber, a substantially horizontal elongated distributor disposed beneath the feeder chamber having a glass refining and distributing channel, said feeder chamber having passage means through which glass flows into the channel in the distributor, bushing means connected with the distributor for flowing streams of glass from the distributor, sensing means disposed above the surface of the glass batch delivered into the melter for sensing the relative position of the batch surface, and means responsive to a signal from the sensing means for varying the speed of the motor to thereby regulate the rate of delivery of glass batch into the melter.

6. Apparatus for processing glass including, in combination, a melting chamber, means for feeding particulate glass batch into the melting chamber, a motor for operating the batch feeding means, means for heating the glass batch in the melting chamber to melt the glass, a feeder chamber disposed beneath the melting chamber and arranged to receive glass from the melting chamber, a substantially horizontal elongated distributor disposed beneath the feeder chamber having a glass refining and distributing channel, said feeder chamber having passage means through which glass flows from the feeder chamber into the channel in the distributor, a stream feeder connected with the distributor for flowing streams of glass from the distributor, the glass in the feeder chamber being heated by electric energy, sensing means for sensing the level of the glass in the distributor channel, and means responsive to the sensing means for controlling flow of electric energy to said feeder chamber for varying the viscosity of the glass in the feeder chamber and hence the flow rate of glass delivered into the channel for maintaining substantially constant the level of glass in the channel.

7. Apparatus for processing glass including, in combination, a melting chamber, means for feeding particulate glass batch into the melting chamber, a motor for operating the batch feeding means, means for heating the glass batch in the melting chamber to melt the glass, a second chamber disposed beneath the melting chamber and arranged to receive molten glass from the melting chamber, an elongated distributor disposed beneath the second chamber having a glass refining and distributing channel, means for heating the glass in the channel for refining the glass, said second chamber having passage means through which glass flows into the channel in the distributor, stream feeder means connected with the distributor for flowing streams of glass from the distributor, first sensing means disposed above the surface of the glass batch in the melter for sensing the relative position of the batch surface, means responsive to a signal from the first sensing means for varying the speed of the motor to regulate the rate of feeding glass batch into the melter, the glass in the second chamber being heated by electric energy, second sensing means for sensing the level of the glass in the distributor channel, and means responsive to the said second sensing means for controlling the flow of electric energy to said second chamber for varying the viscosity of the glass in the second chamber and thereby vary the flow rate of glass delivered into the channel for maintaining substantially constant the level of the glass in the channel.

* * * * *

UNITED STATES PATENT OFFICE
CERTIFICATE OF CORRECTION

Patent No. 4,023,950　　　　　　　　　Dated May 17, 1977

Inventor(s)　　　　　Hellmut I. Glaser

It is certified that error appears in the above-identified patent and that said Letters Patent are hereby corrected as shown below:

On the cover sheet insert — [73] Assignee Owens-Corning Fiberglas Corporation, a corporation of Delaware.

Signed and Sealed this

*Eleventh* Day of *October 1977*

[SEAL]

*Attest:*

RUTH C. MASON　　　　　　　　LUTRELLE F. PARKER
*Attesting Officer*　　　*Acting Commissioner of Patents and Trademarks*